United States Patent [19]

Swartz et al.

[11] 4,251,798
[45] Feb. 17, 1981

[54] PORTABLE LASER SCANNING ARRANGEMENT FOR AND METHOD OF EVALUATING AND VALIDATING BAR CODE SYMBOLS

[75] Inventors: Jerome Swartz, Stonybrook; Shelley A. Harrison, Dix Hills; Edward Barkan, Bayshore; Frank Delfine, Farmingville, all of N.Y.; George Brown, Oquossoc, Me.

[73] Assignee: Symbol Technologies, Hauppauge, N.Y.

[21] Appl. No.: 911,171

[22] Filed: May 31, 1978

[51] Int. Cl.³ .............................................. G06K 9/24
[52] U.S. Cl. ........................ 340/146.3 SY; 235/462; 235/472; 250/568; 340/146.3 F; 350/6.6; 350/6.7
[58] Field of Search ................... 350/6.5–6.9; 250/568, 569, 555, 556; 235/454, 455, 462, 463, 472; 340/146.3 F, 146.3 Z, 146.3 SY

[56] References Cited

U.S. PATENT DOCUMENTS

| 3,622,758 | 11/1971 | Schanne | 250/555 |
|---|---|---|---|
| 3,676,645 | 7/1972 | Fickenscher et al. | 340/146.3 F |
| 3,685,723 | 8/1972 | Berler | 235/472 |
| 3,812,347 | 5/1974 | Cunningham et al. | 235/472 |
| 3,909,594 | 9/1975 | Allais et al. | 235/462 |
| 3,916,158 | 10/1975 | Sansone et al. | 340/146.3 F |
| 3,918,028 | 11/1975 | Humphrey et al. | 235/472 |
| 3,991,299 | 11/1976 | Chadima, Jr. et al. | 235/472 |
| 4,001,840 | 1/1977 | Becker et al. | 350/6.3 |
| 4,019,026 | 4/1977 | Nakanishi et al. | 235/467 |
| 4,020,357 | 4/1977 | Punis | 235/455 |
| 4,041,322 | 8/1977 | Hayosh et al. | 250/568 |
| 4,088,981 | 5/1978 | Gott | 340/146.3 SY |
| 4,115,703 | 9/1978 | Dobras | 340/146.3 SY |

*Primary Examiner*—Leo H. Boudreau
*Attorney, Agent, or Firm*—Kirschstein, Kirschstein, Ottinger & Cobrin

[57] ABSTRACT

Laser light reflected from a bar code symbol pattern is detected by a photodetector mounted in a portable scanning head of a laser scanning system. By selecting appropriate threshold values on the analog signal generated by the photodetector, the analog signal is converted to a series of pulses, each pulse width accurately corresponding to the width of a bar from the scanned pattern. A plurality of functions can be determined from the series of pulses, each function being independently selected by keyboard entry from the head, displayed on the head, and/or recorded by a printer remote from the head. Single line or multiple line scans in two orthogonal directions relative to the pattern may be selected. A bimorph or speaker-type oscillatory element may be utilized as a miniature scanning element. Circuitry for synchronizing scanning along both axes, and for generating a signal to drive the bimorph in a uniform, constant velocity manner is also disclosed.

37 Claims, 18 Drawing Figures

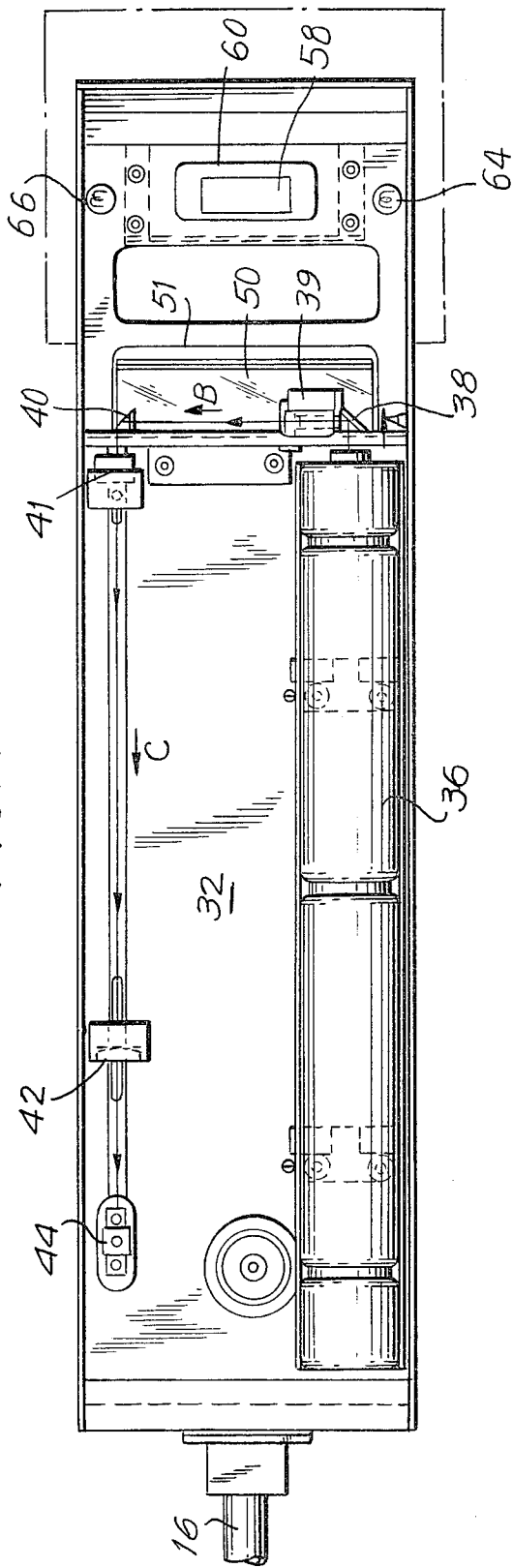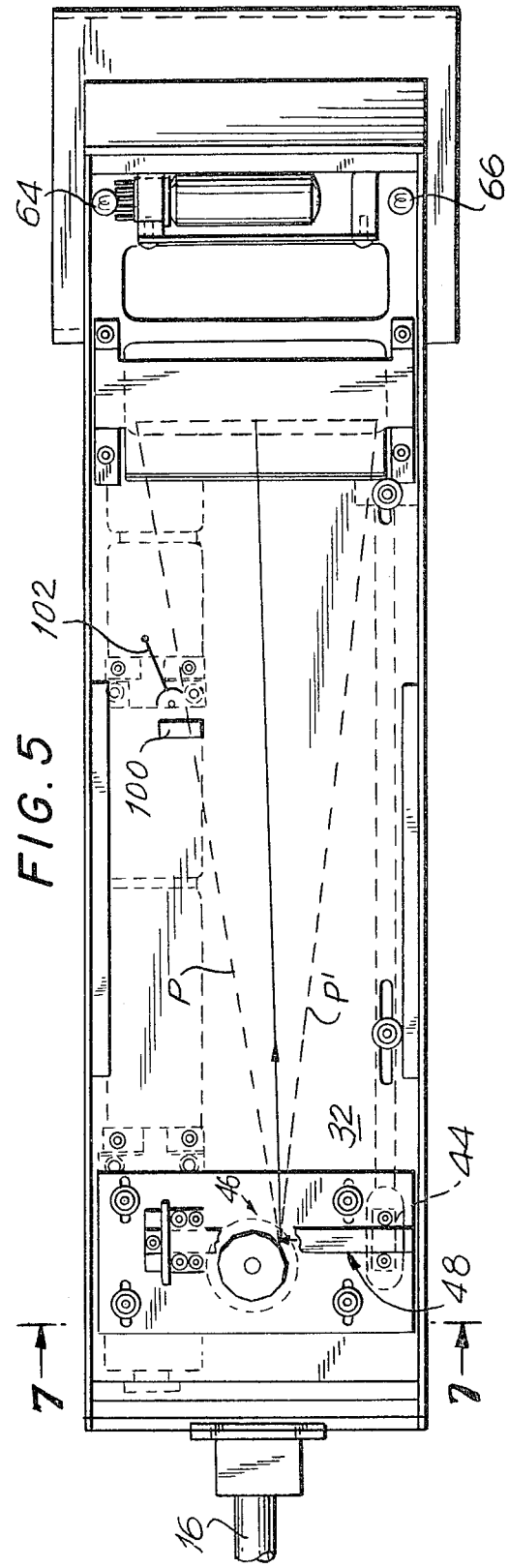

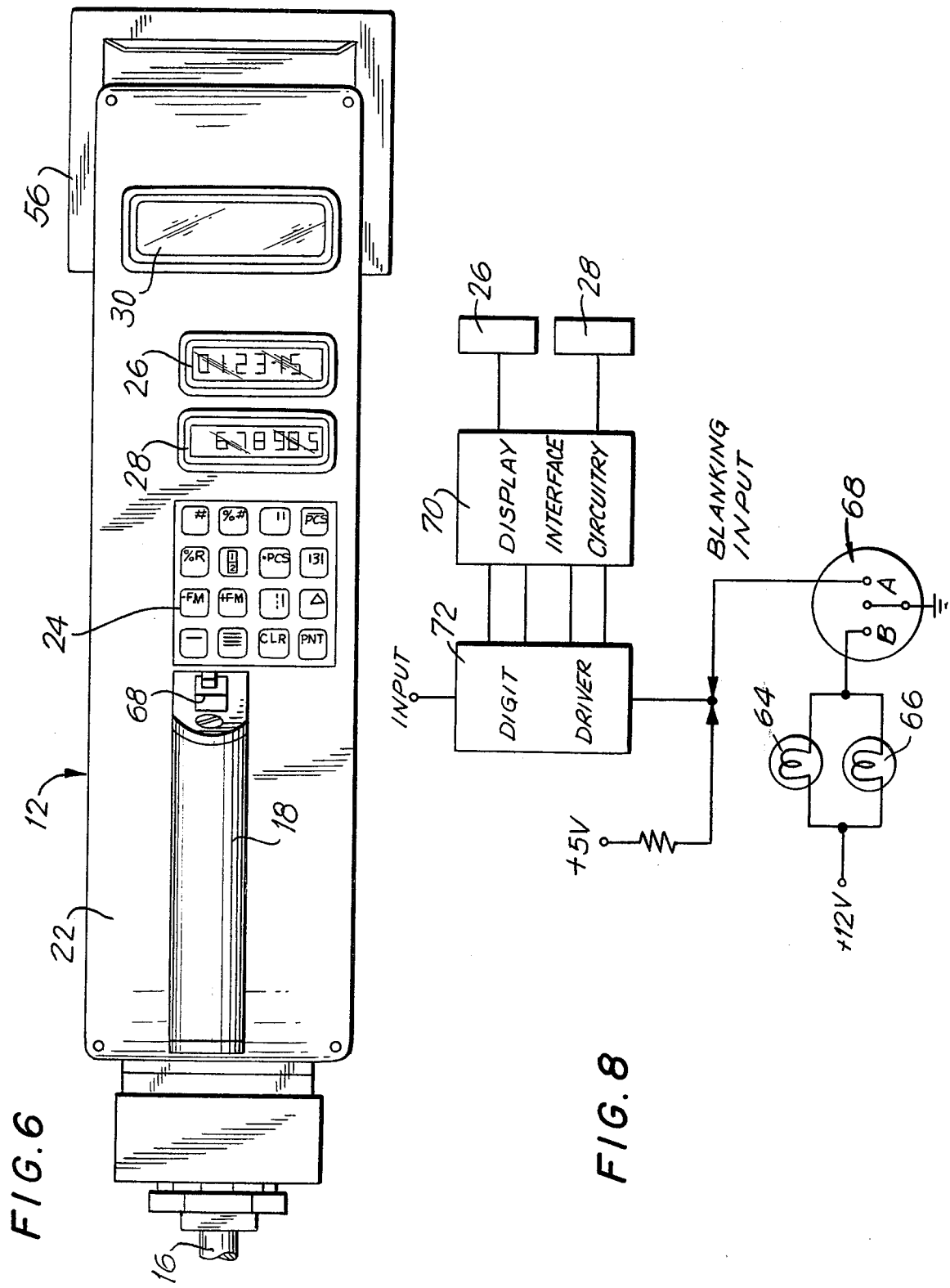

FIG. 12a
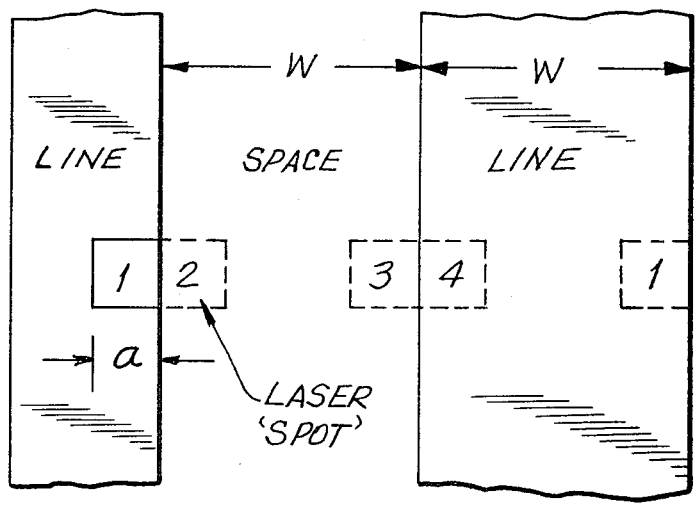
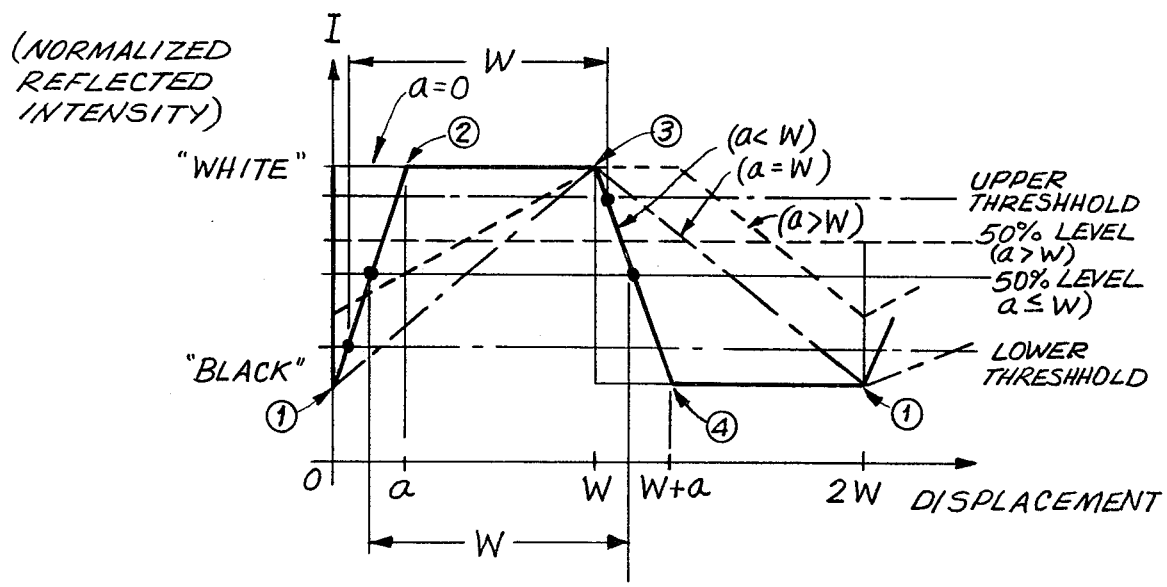
FIG. 12b

PORTABLE LASER SCANNING ARRANGEMENT FOR AND METHOD OF EVALUATING AND VALIDATING BAR CODE SYMBOLS

BACKGROUND OF THE INVENTION

1. Field of the Invention

The present invention generally relates to laser scanning systems and, more particularly, to portable laser scanning arrangements for and methods of evaluating and validating bar code symbols such as Universal Product Code (UPC) symbols.

2. Description of the Prior Art

The grocery and food processing industries have recently developed a universal product code to uniquely designate each assigned product with a series of lines and spaces of varying widths, which pattern decodes to a multiple digit representation. Each such pattern is printed on the labels of even small items, and each line of the pattern therefore must be printed with a rather high degree of graphic precision. Typically, the supermarket check-out counter is provided with a built-in laser scanner and associated electronic circuitry operative for automatically decoding the pattern printed on the product for check-out and inventory purposes.

The graphic arts industry has had considerable difficulty in printing the labels and packaging stock on a mass-production basis due to the necessity of having to print the lines with the appropriate widths and against the appropriate background color. In view of the high production rates involved for grocery products such as soda, beer, milk carton stock, etc., poor quality control over the line widths and over the color contrast between the line color and the background color results in a loss of considerable stock.

Other than the above-described laser scanning systems built into the check-out counters of supermarkets, the prior art has proposed laser scanning heads movable relative to and electrically connected with a console. However, the known laser systems have not proven to be altogether satisfactory for a variety of reasons. First of all, the movable scanning head is not truly portable in the sense that the operation of the packaged laser tube may be affected adversely when the laser is directly hand-held and the user conversely exposed to the hot laser. Secondly, the known heads do not have the capability of increasing measurement accuracy by generating a two-axis scanning pattern comprising a plurality of equidistantly spaced apart parallel scanning lines over at least one-half of the height of the bar code symbol pattern, nor the capability of selecting between a single line scan or the above-described multiple line scan. Thirdly, the known systems do not provide a viewport of sufficient size or illumination to permit a user to properly and reliably superimpose the line scan across the pattern. Fourthly, the known systems do not provide for appropriate synchronization between both axes of scan. Fifthly, the known portable systems rely exclusively on expensive miniature rotary mirrored polygons, galvanometer movements or tuning forks to provide scanning. Sixthly, the bar width measurements taken by the movable scanning head are subject to a considerable amount of noise and modulation, thereby leading to inaccurate measurement evaluation and possible decoding errors. Finally, other ease of operation and evaluation criteria requested by the graphic arts industry have not yet been embodied in a laser scanning system equipped with a portable scanning head.

SUMMARY OF THE INVENTION

Objects of the Invention

Accordingly, it is an object of the present invention to overcome the aforementioned drawbacks of the prior art.

Another object of the present invention is to provide an inexpensive, reliable easy-to-manufacture, and easy-to-service portable scanning head analyzer for a laser scanning system.

Still another object of the present invention is to provide a portable scanning head having a large viewport for registering the line scan over the bar code symbol.

An additional object of the present invention is to select a desired function to be measured and to display the measured function directly on the portable scanning head for ease of operation.

A further object of the present invention is to select either single line or multiple line scan.

A still further object of the present invention is to increase measurement accuracy by generating a two-dimensional scanning pattern comprising a plurality of equidistantly spaced apart parallel scanning lines over at least one-half of the height of the bar code symbol pattern.

A yet further object of the present invention is to properly synchronize scanning along two orthogonal axes of scan.

Another object of the present invention is to employ a bimorph or speaker-type uniformly oscillating element as a scanning element along at least one axis of scan.

Still an additional object of the present invention is to accurately measure bar widths by appropriately selecting threshold values on the analog signal generated by the photodetector.

Still a further object of the present invention is to suppress measurement error due to noise, non-uniform envelope formation and variable depth of modulation.

Another object of the present invention is to provide new functions and capabilities for a laser scanning system which were heretofore unprovided to the industry.

Features of the Invention

In keeping with these objects and others which will become apparent hereinafter, one feature of the invention resides, briefly stated, in a portable laser scanning head for a laser scanning system for evaluating and validating bar code symbols. A laser and optical assembly directs a light beam towards a bar code symbol for reflection therefrom. A photodetector assembly detects the intensity of the light reflected from the symbol and generates an electrical signal indicative of the detected intensity of the reflected light. A keyboard assembly selects a desired characteristic of the symbol, and a decoder assembly generates data descriptive of the selected characteristic. A display assembly displays the generated data. In accordance with the present invention, the mounting of the keyboard and display assemblies directly on the head facilitates characteristic selection and data reading at the site of the symbol to be analyzed.

In further accordance with the invention, a carrying handle is mounted on the head at a region remote from and out of thermal contact with the laser. Moreover, the laser and optical components are mounted on a shock mounting plate. Also, a resilient pad is provided on the head to conform the latter to the surface on which the symbol is imprinted.

Another feature of the invention is embodied in illuminating a viewport through which the symbol can be observed, and in disabling the display and/or decoder assemblies upon such illumination.

Still another feature of the invention resides in the generation of a raster-type scan pattern comprised of a plurality of generally parallel, equidistantly spaced-apart scan lines. This multiple line scanning is swept over a distance at least equal to one-half of the transverse height of the symbol.

The laser scanning system also has the capability of generating a single line scan, and the keyboard permits a user to select either the multiple or the single line mode of operation.

Yet another feature of the invention synchronizes the Y-axis scan over the height of the symbol with the X-axis scan over the width of the symbol. A "start of scan" pulse is generated each time another scan starts to sweep.

A bimorph and/or a speaker-type oscillatory element can be successfully used for either the X-axis and/or the Y-axis scanning element. Novel circuitry for driving the bimorph and/or the speaker-type element such that the light beam is swept in a uniform, constant velocity manner is also disclosed.

An additional feature of the invention is embodied in a noise-free signal processing circuit and method of processing the analog time-varying electrical signal generated by the photodetector in order to accurately determine line widths of the bar code symbol to be analyzed despite the presence of undesirable noise, non-uniform envelope curvature and variable depth of modulation. This processing circuit and method establish predetermined upper and lower threshold levels and generate a full series of digital pulses, each successive pulse having a time period which corresponds to the width of each successive line of the symbol to be analyzed.

Yet another feature of the invention resides in a printer mechanically incorporated into a console of the laser scanning system. Each and every function selected by the keyboard can be independently recorded by this printer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a bottom sectional view as taken along line 4—4 of FIG. 2;

FIG. 5 is a top sectional view as taken along line 5—5 of FIG. 2;

FIG. 6 is a top plan view as seen from directly above the portable laser scanning head of FIG. 1 and shows the viewport, display elements and keyboard of the head;

FIG. 8 is a schematic circuit diagram of a display disabling circuit as used with the scanning head of FIG. 1;

FIG. 12(a) is a diagrammatic representation of a spot scanning analog signal model;

FIG. 12(b) is a graph of normalized reflected light intensity versus displacement as a function of a=0, a<W, a=W, a>W, and also shows various threshold levels for determining line widths;

DESCRIPTION OF THE PREFERRED EMBODIMENTS

Figure 1:
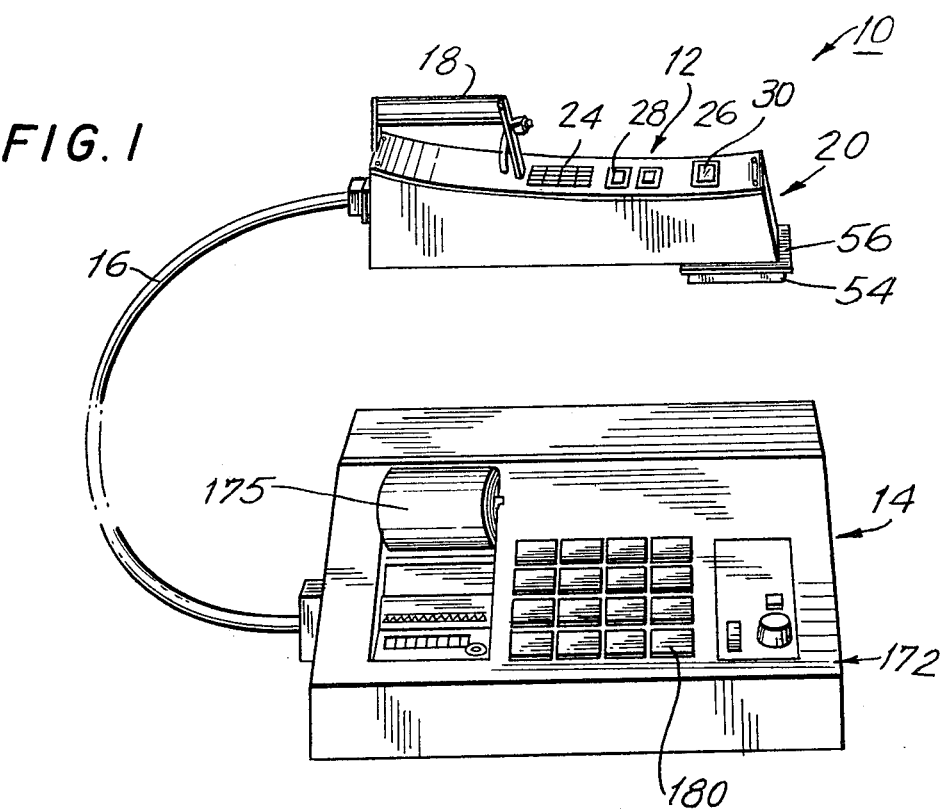
FIG. 1 is a perspective view of the portable laser scanning head and the console of the laser scanning system in accordance with the present invention.
Figure 3:
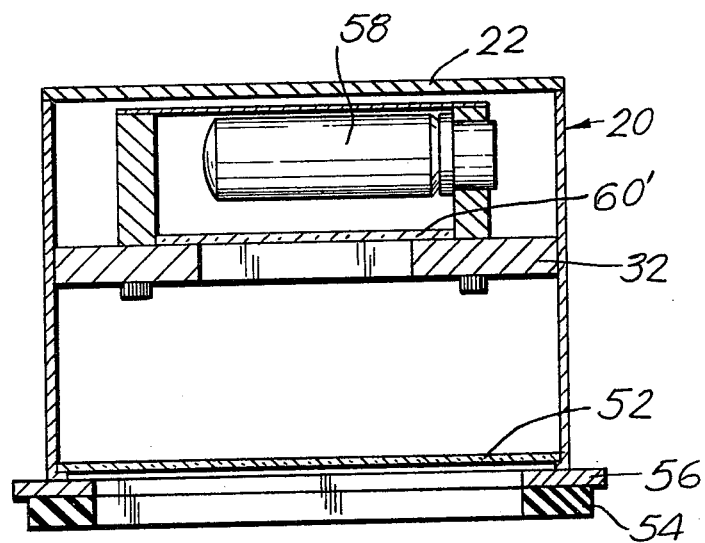
FIG. 3 is a side sectional view as taken along line 3—3 of FIG. 2.

Referring now to the drawings and particularly to FIG. 1 thereof, reference numeral 10 generally identifies the laser scanning system analyzer which includes a portable scanning head 12 and a console 14. The portable head 12 is movable relative to and electrically connected to the electronic circuitry contained within console 14 by cable 16.

Before describing the structural and functional aspects of this scanning system and its method of recognizing and processing signals which relate to bar code symbols, it is believed to be appropriate to briefly describe the coding scheme of a Universal Product Code symbol. The UPC symbol may be represented by a 12 digit "A version" or a 6 digit "E version." In either version, each digit of the multi-digit representation code is represented by four "bars" of varying width: two printed ones (also referred to herein as "dark" or "black" levels, or as "lines"), and two non-printed field background ones (also referred to herein as "light" or "white" levels, or as "spaces") between the lines. The width of each line or space, which may be from one to four times a nominal width, is the information bearing part of the code. An equal width line-space-line-space combination is respectively provided at the center, left end and right end of the UPC symbol, and these combinations are respectively known as the center, left and right guard bars. Recognition of either the left or right guard bars indicates the onset of a UPC symbol whose first five digits represent the manufacturer's code number and whose next five digits represent the item number. A margin or clear area surrounds the entire symbol.

It will be expressly understood that the present invention can be utilized for analyzing symbol bar codes other than the UPC code. For example, the present invention can also be used to decode EAN, Codabar and other symbol codes. The following description given in the context of decoding UPC symbol codes has been chosen merely for purposes of ease of explanation and is not intended to be self-limiting in any manner whatsoever.

Turning again to FIG. 1, the scanning head 12 has a carrying handle 18 which is located above the top wall 22 of the housing 20. As will be described in greater detail below, a keyboard 24, a first display element 26, a second display element 28, and a viewport 30 are all mounted on the top wall 22.

The optical, electrical and mechanical components located within the interior of the scanning head housing 20 are shown in FIGS. 2-6. A center plate or optical bench 32 subdivides the housing interior into an upper compartment bounded by top wall 22 and into a lower compartment bounded by bottom wall 34.

As best shown in FIG. 4, a laser 36, particularly a Helium-Neon laser, is mounted below plate 32 and is operative to emit a laser light beam in direction of arrow A towards a right angle prism 38, whereupon the light beam is reflected in direction of arrow B through expanding lens 39 and towards another right angle prism 40, whereupon the reflected light beam is again reflected in direction of arrow C through converging lens 41 and towards the focusing objective lens 42, whereupon the focused light beam is directed towards still another right angle prism 44. Prism 44 is oriented to direct the light upwardly in direction of arrow D to the upper compartment above the plate 32 upon which the X-axis and the Y-axis scanning elements 46, 48 are mounted.

The operation of the X- and Y-axis scanning elements will be discussed below in detail. At this stage of the discussion, it is sufficient to understand that the scanning light beam leaving the scanning elements 46, 48 is directed generally in direction of arrow E towards the exit mirror 50 which is mounted at a $22\frac{1}{2}°$ angle relative to the plate 32. The scanning beam is reflected off the exit mirror 50 and directed at a 45° angle through the exit aperture 51 formed in the plate 32, and thereupon through the exit port 52 formed in the bottom wall 34 to a reference plane located exteriorly of the housing 20. It will be understood that the UPC symbol to be scanned will normally be located at or near the reference plane.

The respective optical distances between the expanding lens 39, the converging lens 41, the focusing objective lens 42 and the reference plane, together with the respective focal lengths of the above-identified lenses, have been carefully chosen to produce an approximately 8 mil spot in cross-section of a single light beam at the reference plane, and to produce an approximately 8 mil spot in cross-section at a distance of approximately 2 inches further away from the reference plane. This "depth of field" feature permits a user to scan bar code symbols imprinted both on a flat surface and on a curved surface merely by moving the head towards a position anywhere within 2" of the symbol.

A support plate 56 is mounted on bottom wall 34 and surrounds the exit port 52. A resilient contact pad 54 is mounted on the plate 56 and serves to contact and confrom to the surface on which the bar code symbol is imprinted. The pad 54 also serves to keep ambient light from entering the exit port 52.

The scattered light reflected off the bar code symbol is directed through a Kodak Wratten 26 red color filter 60' towards the photodetector 58 which is preferably a photomultiplier tube (PMT). The PMT is operative to produce an analog voltage signal which has an amplitude proportional to the intensity of the light received by the PMT. The circuitry for processing this analog signal is described below.

As will be seen from FIG. 2, the mounting of components above and below the center plate 32 permits a great amount of working room for ease of serviceability due to the rather low space density of the components. Further, no components are mounted directly on the housing walls to thereby minimize damage to the components due to shock, stress in assembly, etc.

The mounting of the synthetic plastic material handle 18 remote from the laser tube 36 permits the head to be easily handled without thermal interference from the heated laser, that is a user's hand will not be burned after long-term use. Further, the user is likewise kept away from the laser to thereby prevent thermal, mechanical and electrical interference with the latter.

The viewport 30 is covered by a light blue filter 60 which limits the amount of ambient "red signal" light entering the viewport while still allowing viewing of contrasting symbol bar and space colors, and a light filter baffle 62 which essentially only permits light to enter along the viewing angle in direction of arrow F. The viewport 30 is much larger as compared to prior art devices in order to permit easy viewing of the entire symbol in both the X- and Y- directions. However, the light blue filter 60 also inhibits the user from properly viewing the bar code symbol. In order to permit the user to properly see the symbol through the viewport, a pair of lamps 64, 66 are electrically connected to momentary push button switch 68 which is mounted at the front end of the handle 18. The lamps 64, 66 are located at opposite sides of the exit port 52 and serve to illuminate the symbol registered in the exit port. Of course, the illumination introduced by the lit lamps supplement the laser light scattered off the symbol, and therefore the electronic measurement and/or detecting and/or display circuitry must be disabled during the time that the lamps are lit for proper utilization.

FIG. 8 shows a preferred embodiment for disabling the display elements 26, 28 which are preferably 9 digit LED display elements driven by display interface circuitry 70 and a digit driver 72. When switch 68 is set to position A, the display lamps 64 and 66 are off and the digit driver is operative because it is grounded. When the switch 6 is manually depressed and set to position B, the display lamps are lit, and the digit driver is disabled because it is no longer grounded.

Figure 2:
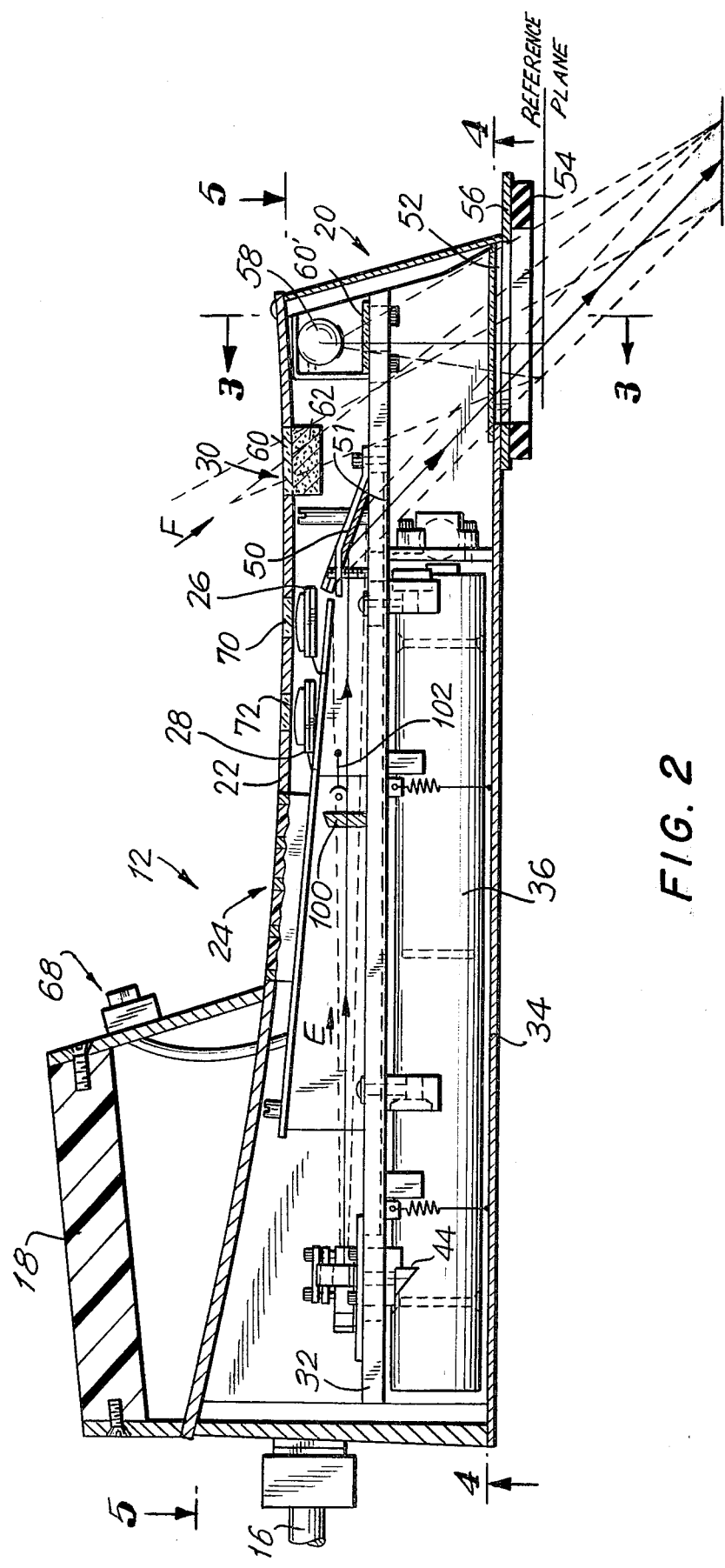
FIG. 2 is a partially sectioned view lengthwise of the laser scanning head of FIG. 1.

As best shown in FIGS. 2 and 6, another important structural feature in the scanning head is that the display elements 26, 28, which are respectively covered by transparent colored covers 70 and 72 are mounted directly on the top wall 22 of the head. Moreover, the keyboard 24 with all of its function selector keys are likewise mounted on the top wall 22. This means that a particular function can be chosen directly at the site of the symbol to be analyzed, and also that the particular corresponding measured results can be displayed to the user again at the site of the symbol independent of cable length and without looking at the conventional console-mounted displays. This novel on-site feature of the scanning head overcomes prior art systems which provided for function selection and display at the console away from the actual measuring site.

Figure 7:
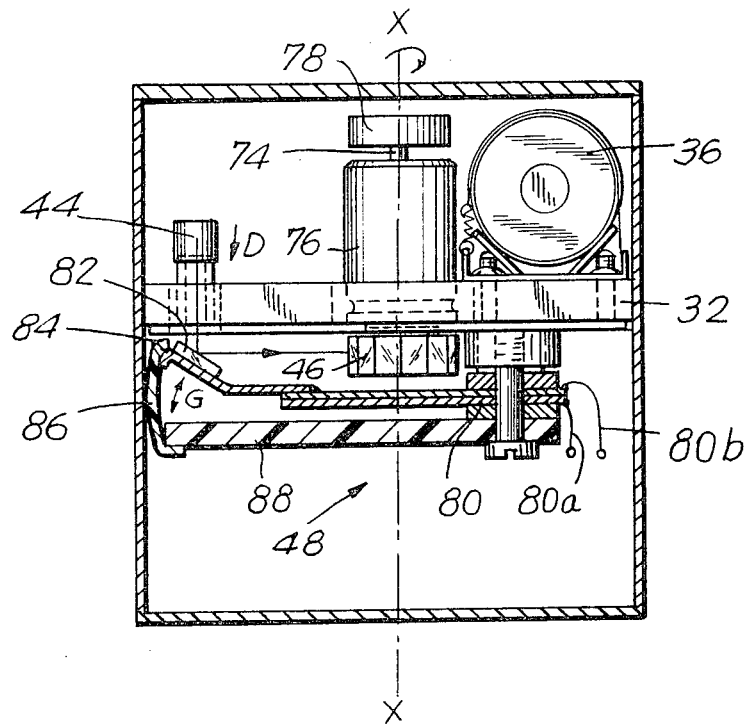
FIG. 7 is a side sectional view as taken along line 7—7 of FIG. 5.

Turning now to the X- and Y-axis scanning elements briefly described above, the X-axis scanning element 46 is a polygonally-shaped brass wheel having adjustable mirrored outer surfaces on each of its faces. In FIGS. 5 and 7, the polygon 46 has twelve sides and is mounted on drive shaft 74 for rotation about axis X—X, as opposed to expensive, less efficient eight-sided all-glass conventional miniature polygons. Stepper motor 76 drives polygon 46 at a uniform rate of rotation, and flywheel 78 smooths angular rotation. In the single line scan mode, that is when the Y-axis scanning element is not actuated, the laser light beam directed towards the exit mirror 50 is swept over a distance at least equal to the total width of the longest UPC bar code symbol, and preferably over a much longer distance on the order of 4". As best shown in FIG. 5, the light beam is at end limiting path position P at the beginning of each scan, and is at end limiting path position P' at the end of each scan.

Figure 9:
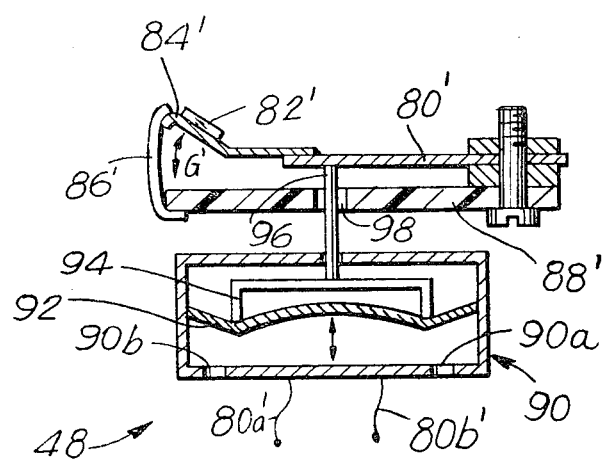
FIG. 9 is a side sectional view analogous to FIG. 7 and shows another type of Y-axis scanning element.

As for the miniature Y-axis scanning element 48, FIG. 7 shows one preferred embodiment using a bimorph or ferro-electric-type oscillating element; and FIG. 9 shows another preferred embodiment using a speaker-type oscillator. Turning first to the embodiment of FIG. 7, the bimorph 80 has its opposite sides connected to a voltage source by wires 80a, 80b. A planar reflecting mirror 82 is mounted on a resilient leaf spring 84 which has one end mounted on the bimorph and its opposite end connected to one end of the flexible mylar tape 86. A support plate 88 fixedly mounts the other end of the bimorph, and the other end of the flexible tape 86 is also mounted on the plate 88.

In operation, when the proper open loop voltage source (i.e. a triangular voltage waveform) is applied to the bimorph, the bimorph reciprocally oscillates in a basically uniform, linear manner in direction of double-headed arrow G. The mirror 82 likewise oscillates and in a stiction-free and backlash-free manner due to the flexible and frictionless mounting at both ends of the suspended leaf spring 84. The mirror movement actually amplifies the movement of the spot and serves to increase the sweep of the Y-axis scans across the height of the bar code symbol.

Turning next to the FIG. 9 embodiment, a spring steel strip 80' is connected to a leaf spring 84' on which a planar reflecting mirror 82' is mounted. As in the earlier embodiment, a mylar tape strip 86' has one end connected to the leaf spring 84', and its other end connected to a support plate 88'. A speaker-type unit 90 includes a flexible diaphragm 92 on which a holder 94 is mounted for movement with the latter. A pusher or whisker 96 has one end mounted on the holder 94, its other end connected to strip 80', and it intermediate region passing with clearance through an aperture 98 formed in the plate 88'.

In operation, when the proper voltage waveform is applied to the speaker 90 via wires 80a', 80b', the diaphragm 92 reciprocably oscillates in a uniform, linear manner in direction of double-headed arrow G'. The mirror 82' likewise oscillates in a stiction-free, backlash-free manner. As before, the mirror movement amplifies the sweep of the Y-axis scans. In addition, air vent ports 99a, 99b are properly adjusted to provide for critical damping of the diaphragm.

In either embodiment, the X- and Y- scanning elements produce a raster-type scan comprised of a plurality of parallel, equidistantly spaced-apart scan lines. The scan lines all extend lengthwise along one dimension, and are stacked one above another in another transverse dimension which is substantially normal to the first-mentioned dimension. The transverse spacing of the multiple scan lines covers an area which is at least equal to one half of the height of the tallest bar code symbol, and preferably at least 75% of the symbol height.

It will be understood that the present invention is not to be limited to a miniature X-axis scanning polygon, nor to a miniature Y-axis scanning bimorph or speaker-type unit. Two bimorphs, or two speakers, or one bimorph and one speaker, could replace the illustrated embodiment, or even a single bimorph element of proper mechanical design electrically driven on both axes.

Figure 10:
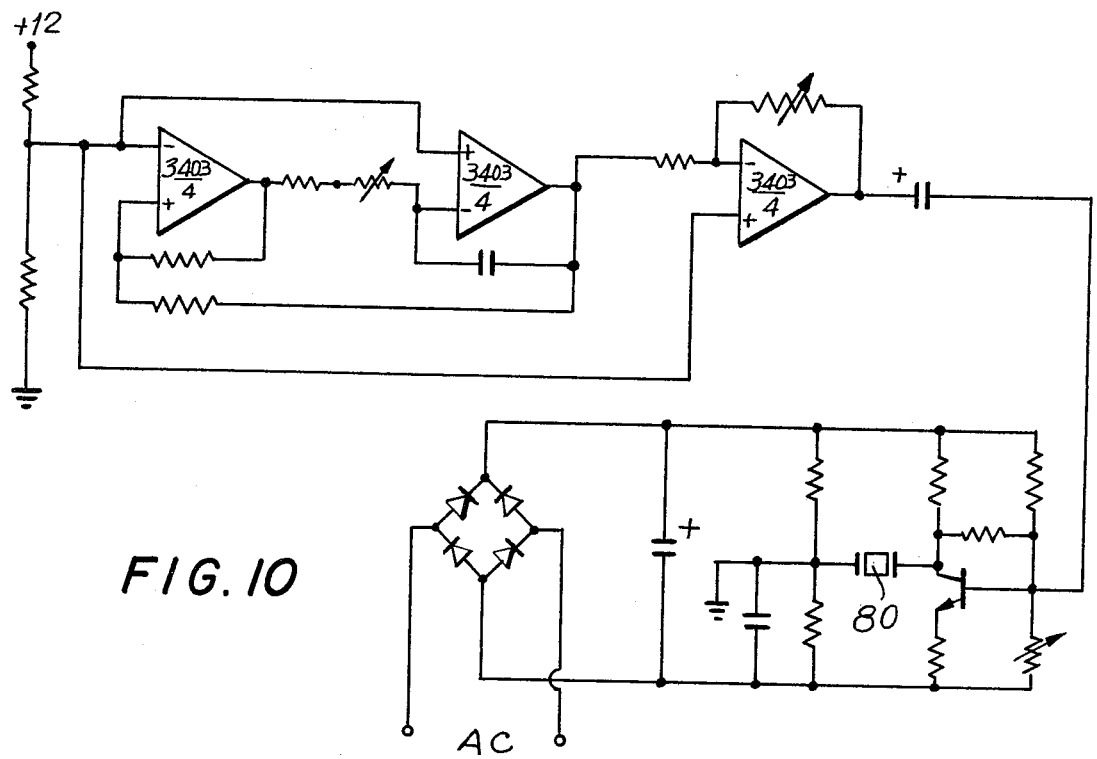
FIG. 10 is a schematic circuit diagram of a circuit for generating a closed loop voltage for driving the bimorph of FIG. 7.

In order to insure that the Y-axis scanning element 48 is driven in a linear, uniform, oscillatory manner, an open loop triangular voltage signal has been found to work well. If additional uniformity and movement of the scanning element is desired (e.g. X-axis), then the closed loop circuit of FIG. 10 may be employed. This closed loop circuit has the following transfer function:

$$T(S) = \frac{X \text{ (distance)}}{V \text{ (voltage)}} = \frac{As + Bs^2}{s^3 + Bs - CA}$$

where A, B and C are general coefficients dependent on the physical and electrical characteristics of the bimorph (e.g. spring constant, capacitance). Near resonant motion of the bimorph might alternately be provided when added movement and less uniformity are required in strict symbol decoding applications.

Figure 11:
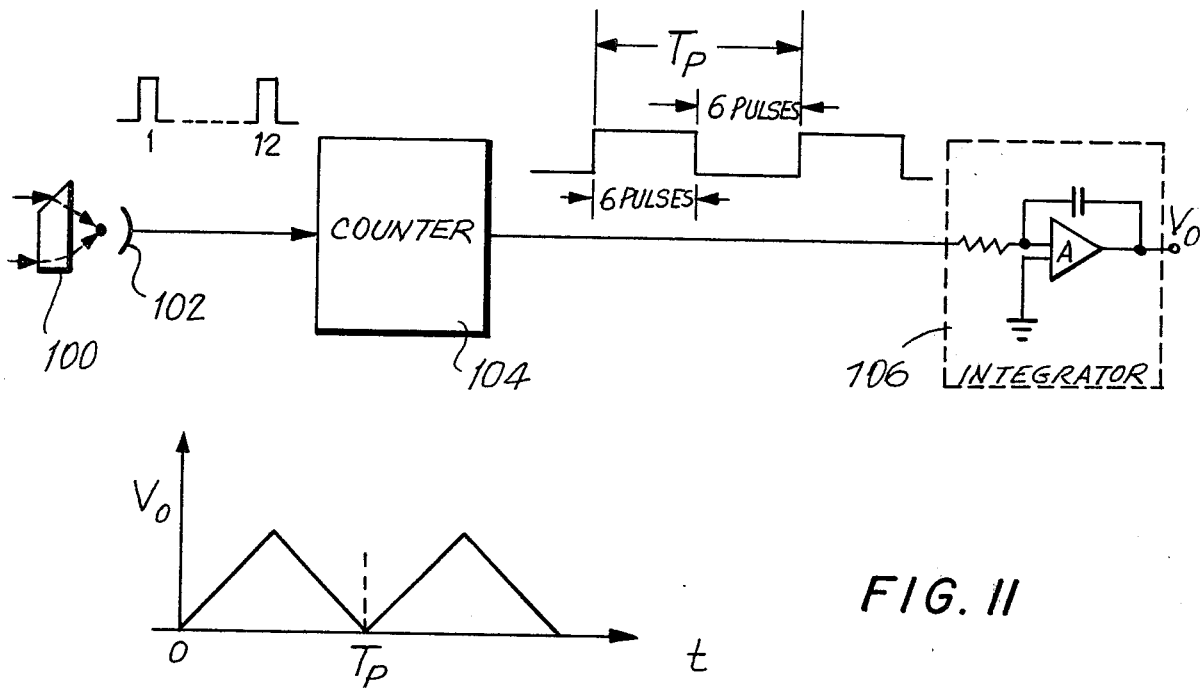
FIG. 11 is a schematic circuit diagram of a combination synchronization circuit for the X- and Y-axis scans and also for generating an open loop voltage for driving the bimorph of FIG. 7.

Turning now to FIG. 11, the illustrated circuit is operative not only to generate the aforementioned Y-axis open loop triangular voltage drive, but also is employed to synchronize the Y-axis scan with the X-axis scan in a novel manner. Turning first back to FIGS. 2 and 5, it will be noted that a Fresnel lens 100 is positioned in the end limiting path position P, and that the light beam passing through lens 100 is focused towards and detected by photodetector 102. Each time another scan line begins, a "start of scan" electrical pulse is generated by the detector 102.

The counter 104 of FIG. 11 is operative to count a first set of six pulses and to generate a high voltage level for this first set, and thereupon is operative to count a second set of six pulses to generate a low voltage level for this second set. After every 12 pulses have been counted, the counter 104 automatically resets. The first and second sets of pulses are thereupon integrated in integrator 106 to generate a triangular waveform of period $T_p$.

The circuit of FIG. 11 therefore time synchronizes the Y-axis scan with the X-axis scan. Every time the 12-sided polygon wheel completes a full 360° revolution, the Y-axis scanning element performs one complete left-right-left motion. Put another way, an integral synchronization ratio of 12:1 is obtained. Of course, as noted above, the triangular waveform is ideal for the bimorph open loop drive. Pairs of scans overlap on the return sweep to provide, for example, six lines of scan.

It will be further understood that the polygon could have been provided with n faces, in which case a counter would have been selected to reset after n pulses had been counted. The counter would be selected to change from high to low voltage level after n/2 pulses had been counted.

If one bimorph is used for the X-axis and another bimorph is used for the Y-axis, and if a sinusoidal voltage of integer frequency is applied to the first bimorph, and a cosine voltage of integer frequency is applied to the second bimorph, then two-dimensional Lissajous type patterns will be produced. If the frequency of the sinusoidal voltage is near the resonant frequency of the bimorph (about 75 Hz), then large non-uniform motion can be obtained from the Y-axis bimorph. Little mechanical and/or optical amplification is required in this latter case to cover the field of view over the bar code symbol. Although the velocity of this scan is not constant, it is adequate for scanning and for decoding of the UPC bar code symbol, because the decode function of the system of the present invention is performed on a character-by-character basis via the delta-ratio algorithm.

As mentioned above, the analog voltage signal generated by the PMT has an amplitude proportional to the intensity of the light reflected from the bar code symbol. The analog signal has alternate peaks and valleys, which respectively correspond to spaces and lines, a non-uniform envelope curvature which extends over the entire width of the analog signal, a variable depth of modulation, and low-level noise introduced by variations in the supply voltage, drift in the laser, and drift in the PMT. The non-uniform envelope curvature is introduced because light scattered from the line and space combinations at the extreme ends of the bar code symbol must travel through a greater distance than the line and space combinations at the center of the bar symbol and is at a greater angle relative to the PMT. This curvature is made worse when the bar code symbol is imprinted on a product having a curved outer surface.

It is desired to obtain the width of the scanned lines from the aforementioned analog signal in the presence of the above-described undesirable noise, envelope and depth of modulation. Once these widths are properly determined, a decode computer is employed to decode the symbol and/or to analyze certain selected properties of the symbol.

In order to fully appreciate the problem of just how to determine the actual width of any scanned line, FIGS. 12(a), (b) show an analog signal model. The laser spot is assumed to be a square spot (identified by position reference characters 1, 2, 3 and 4) of dimension $a \times a$. As the square spot is moved from position 1 over the space of width W for the case $a<W$, then the intensity gradually increases and reaches a maximum value at position 2. Thereupon, the intensity remains constant until position 3, whereupon further movement causes the intensity to decrease to a minimum value at position 4. The case of $a<W$ generates a trapezoidal wave shape, whereas the case of $a=W$ generates a triangular wave shape in self-explanatory manner, and the case of $a<W$ generates a modified trapezoidal wave shape again in self-explanatory manner. The case of $a=0$ has likewise been illustrated, and it will be noted that the generated wave shape is rectangular.

One conclusion to be drawn from FIG. 12(b) is that the smaller the spot size is, the easier it is to determine where to begin and where to stop measuring W. Indeed, some prior art non-laser UPC symbol analyzers scanners use a 1 mil spot size. However, such small-sized spots introduce reliability errors. The industry guideline is to use an 8 mil spot size to reduce such reliability errors. However, such larger-sized spots generate a non-rectangular waveshape having a rising and a falling slope. It is by no means a simple question as to what pick-off points along the non-idealized sloped shape of a real waveform should be chosen to determine the start and end of the line width measurement.

The present invention recognizes the fact that the 50% level between the amplitude of a peak and the amplitude of a subsequent valley can be used as start and end points to determine W. The present invention likewise recognizes that one can select an upper predetermined threshhold level which is slightly below (e.g. 1.4 volts) the amplitude of the peak, and a lower predetermined threshhold level which is slightly above (e.g. 1.4 volts) the amplitude of the valley. These aforementioned threshhold levels can also be used to determine W, and FIG. 13(a) schematically illustrates a signal processing circuit which converts the analog signal from the PMT to a fully digitized signal which accurately corresponds to the widths of the lines and the spaces of the bar symbol pattern even in the presence of the aforementioned noise, envelope curvature and variable depth of modulation.

Figure 13A:
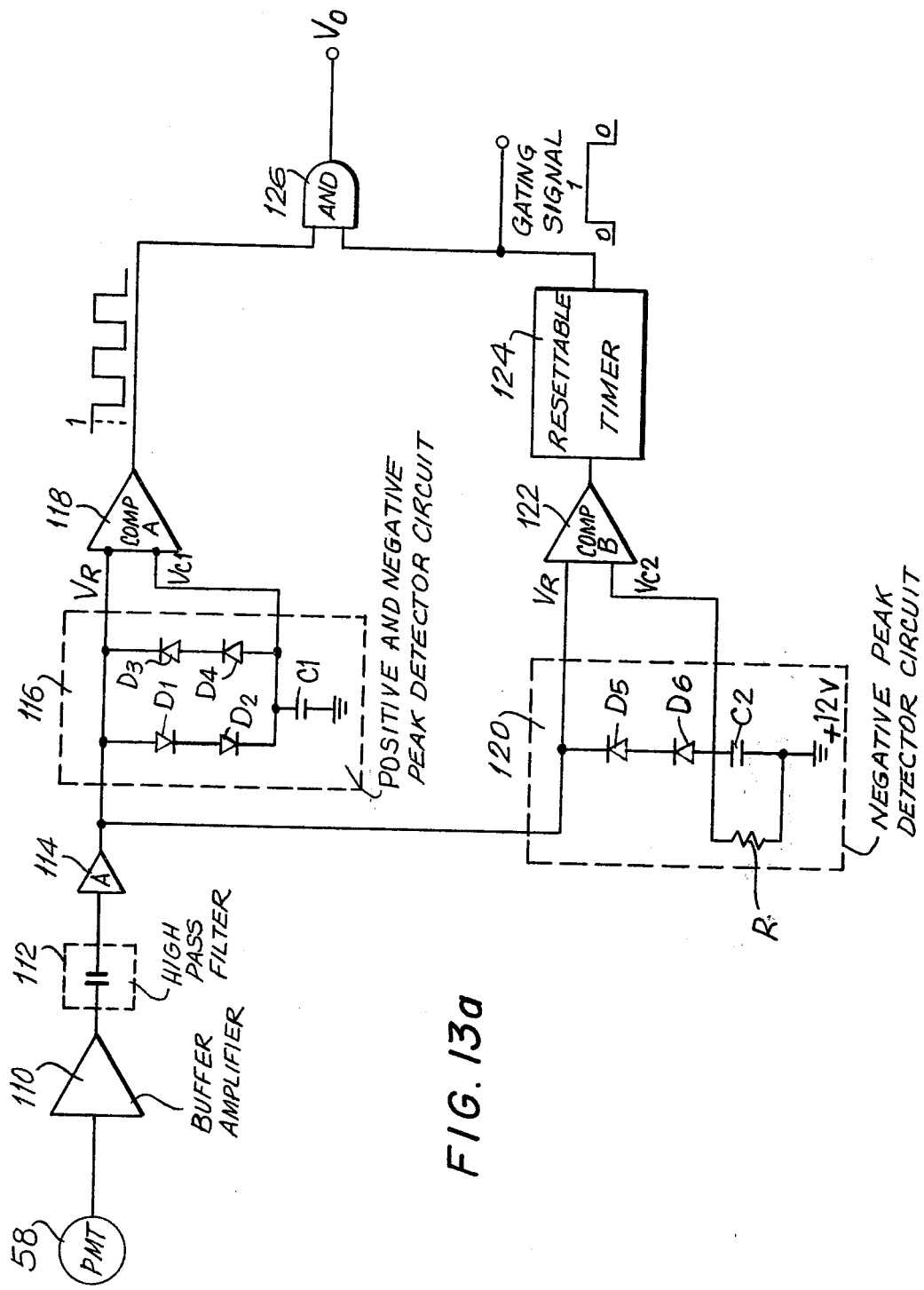
FIG. 13(a) is a schematic circuit diagram of an analog-to-digital circuit for determining line widths.

Turning then to FIG. 13(a), the analog signal from the PMT 58 is first fed to a buffer amplifier 110, then to a high pass filter 112 (e.g. eliminate 60 cycle hum), and thereupon to a gain amplifier 114 from which a reference voltage $V_R$ is generated and conducted to a reference input terminal of comparator (A) 118. The other input terminal of comparator 118 is fed a time varying voltage $V_{C1}$ which tries to follow $V_R$.

The positive section of peak detector circuit 116 comprises a pair of diodes $D_1$ and $D_2$ connected in series in forward-biased relationship relative to capacitor $C_1$. The negative section of peak detector circuit 116 comprises a pair of diodes $D_3$ and $D_4$ connected in series in reverse-biased relationship relative to capacitor $C_1$. It will be noted that the voltage across capacitor $C_1$ ($V_{C1}$) will intersect the reference voltage curve whenever $V_{C1}$ is about 1.4 volts above or below a respective valley or peak due to the fact that each diode has a forward voltage drop of 0.7 volts. However, the very first line-space combination (i.e. the first guard bar) is not detected because $V_{C1}$ is not greater than $V_R$ at the very beginning of the scan. See region A of FIG. 13(b) where no cross-over appears.

Figure 13B:
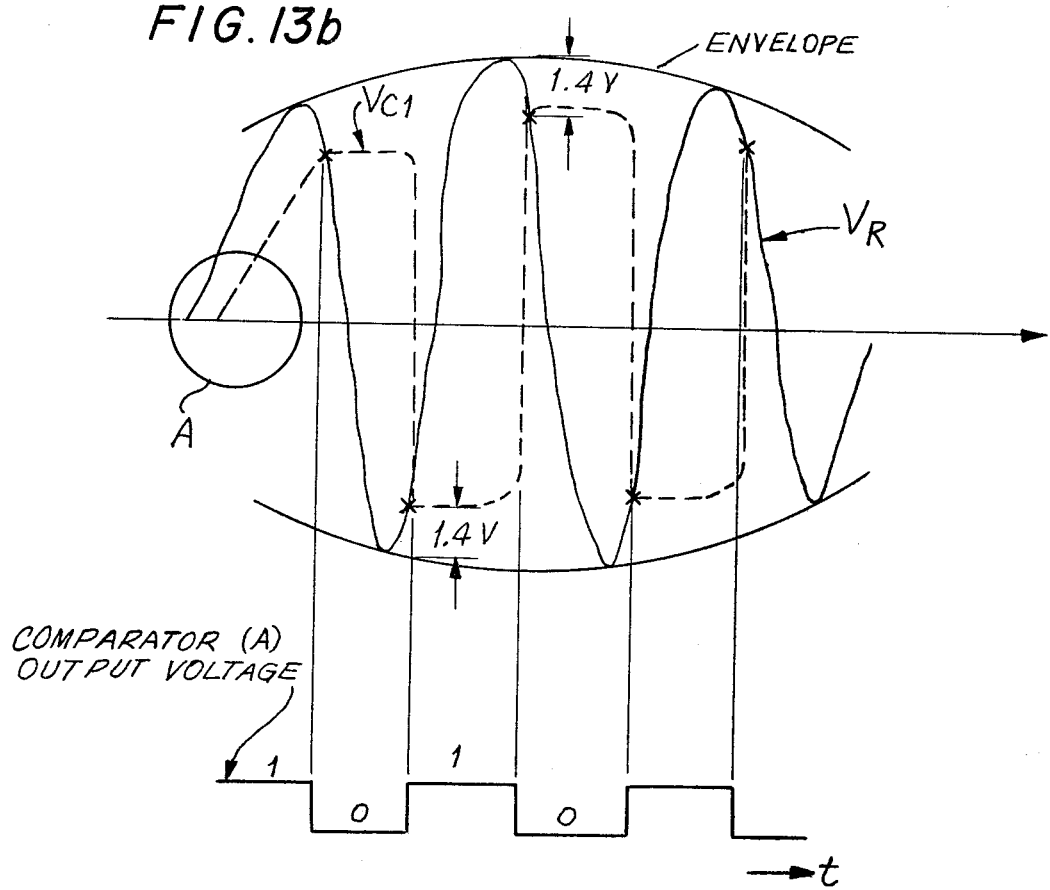
FIG. 13(b) is a diagrammatic representation of the voltage versus time characteristic for $V_R$, $V_{C1}$, and the comparator (A) output voltage of FIG. 13(a)

The comparator 118 generates a high voltage level whenever $V_{C1} > V_R$ and a low voltage level whenever $V_{C1} < V_R$ as shown below FIG. 13(b), except for the first guard bar as described above. This signal is fed to one input terminal of AND-gate 126.

The reference signal $V_R$ is also fed to a reference input terminal of comparator (B) 122. The other input terminal is supplied with time varying voltage $V_{C2}$ which tries to follow $V_R$.

The negative peak detector circuit 120 comprises a pair of diodes $D_5$ and $D_6$ connected in series in reverse-biased relationship relative to capacitor $C_2$. A resistor R is connected across capacitor $C_2$, and a +12 V dc source is applied to the capacitor $C_2$. It will be noted that the voltage $V_{C2}$ will intersect the reference voltage curve whenever $V_{C2}$ is about 1.4 volts above a respective valley due to the fact that the total voltage drop across diodes $D_5$ and $D_6$ equals 1.4 volts.

Figure 13C:
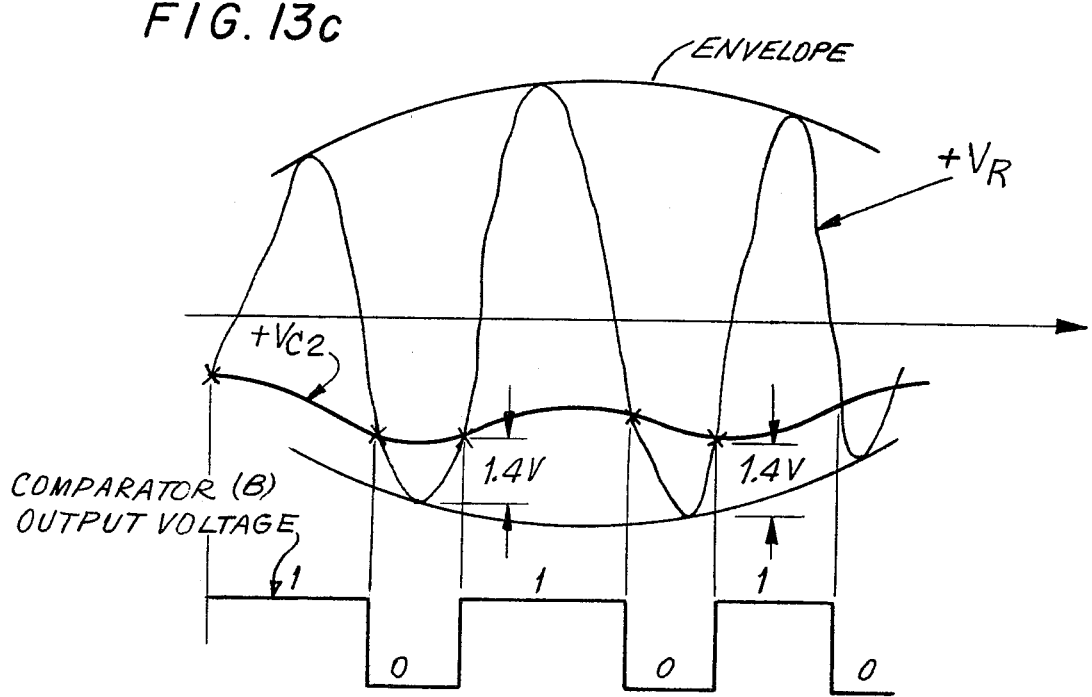
FIG. 13(c) is a diagrammatic representation of the voltage versus time characteristic for $V_R$, $V_{C2}$, and the comparator (B) output voltage of FIG. 13(a)

The comparator 122 generates a high voltage level whenever $V_{C2} > V_R$ and a low voltage level at all other times. The comparator output voltage waveform of FIG. 13(c) is fed to a resettable timer or retriggerable one-shot 124 before being fed to the other input terminal of the AND-gate 126. The resettable timer 124 is operative to continuously generate a high voltage level as long as pulse after pulse arrive in time. If any pulse does not arrive before the built-in time constant of the timer has elapsed, then the timer will generate a low voltage level. Put another way, the output gating pulse signal of the timer 124 is a rectangular shape whose time period equals the total sum of all of the individual time periods of all of the line-and-space combinations of the bar code symbol.

The output voltage waveform ($V_0$) of the AND-gate 126 is the full series of digital pulses of the complete bar code symbol including the very first guard bar. This set of digital pulses can now be decoded and processed in accordance with the selected function on the keyboard.

It will be observed that noise on the analog signal has been suppressed, and that the effects of envelope curvature and variable depth of modulation have been significantly reduced, if not completely eliminated. That is to say, unlike prior art analog-to-digital converter circuits which employ peak-to-peak envelope detection circuitry and then electronically subtract the envelope component, the method and circuit of the present invention does not depend directly on slope detection.

It will further be observed that the analog-to-digital converter circuit of the present invention continuously generates the full series of digital pulses of the complete bar code symbol anywhere within the 2" depth of field and that as stated above, the method and circuit of the present invention do not track the slope of the envelope curvature.

Turning then to the various functions which can be selected by keyboard entry, the present invention not only displays certain well-known functions in a novel manner, but also displays certain newly-defined functions.

Figure 15:
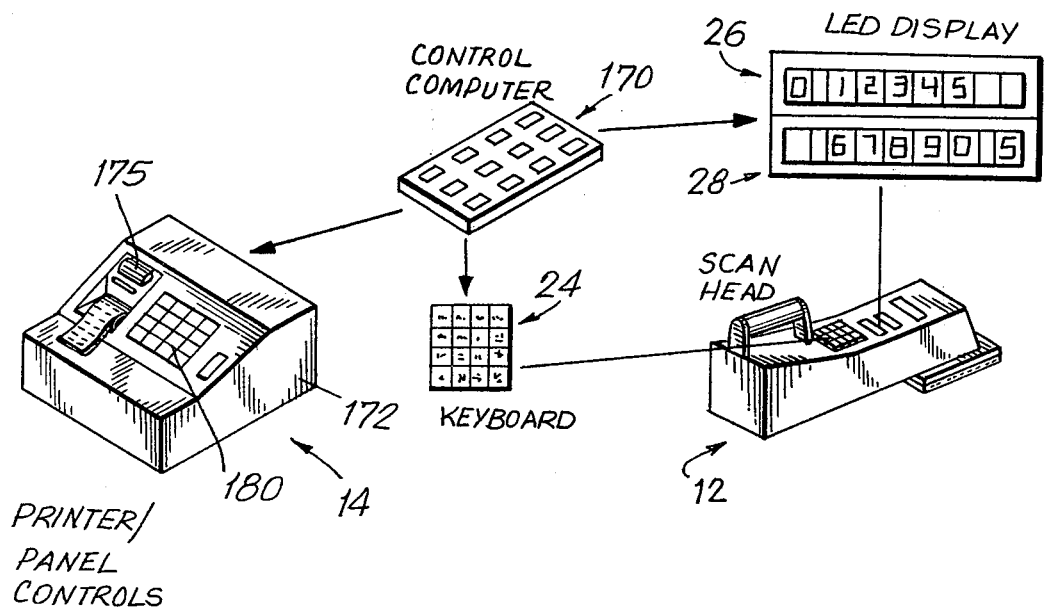
FIG. 15 is a diagrammatic representation of keyboard entry into the control computer, and control signal output for controlling the LED display on the scanning head and/or for controlling the print display on the console of the laser scanning system of FIG. 1.

For example, the "DECODE SYMBOL" key, which initiates decoding of the full series of pulses which correspond to the bar code symbol, is admittedly known in the art. However, the present invention displays the decoded digits in a novel manner. With reference to the LED display elements 26, 28 in FIG. 15, it will be noted that for a 12 digit code, the first digit "0" is displayed at the extreme left of element 26. This first digit specifies the particular industry to which the goods belong. The next set of five digits on the element 26 is spaced from the first digit. This latter set of five digits represents the manufacturer's code number. Now, with respect to element 28, the next five digits are presented directly below the first-mentioned set on element 26. This second set of five digits represents the item or product number assigned by the manufacturer. Finally, the last digit is a so-called check digit and is spaced from the second set of five digits.

This novel formatted display overcomes prior art displays which present the twelve digits along a single line with no separation between the groups of digits. It will be appreciated that this novel display is a very convenient aid for a user, particularly with other measurement readouts of the 8-over-8 display.

An entirely new function is determined upon depressing the "dynamic print contrast signal (PCS)" key. The dynamic print contrast ratio is defined as the ratio of the difference between light reflected from the lines and that reflected from the spaces, to the actual light reflected from the spaces during scanning. PCS is calculated once for each span of a bar code symbol, and represents an average evaluation at four points of the overall color contrast or readability of the symbol.

Figure 14:
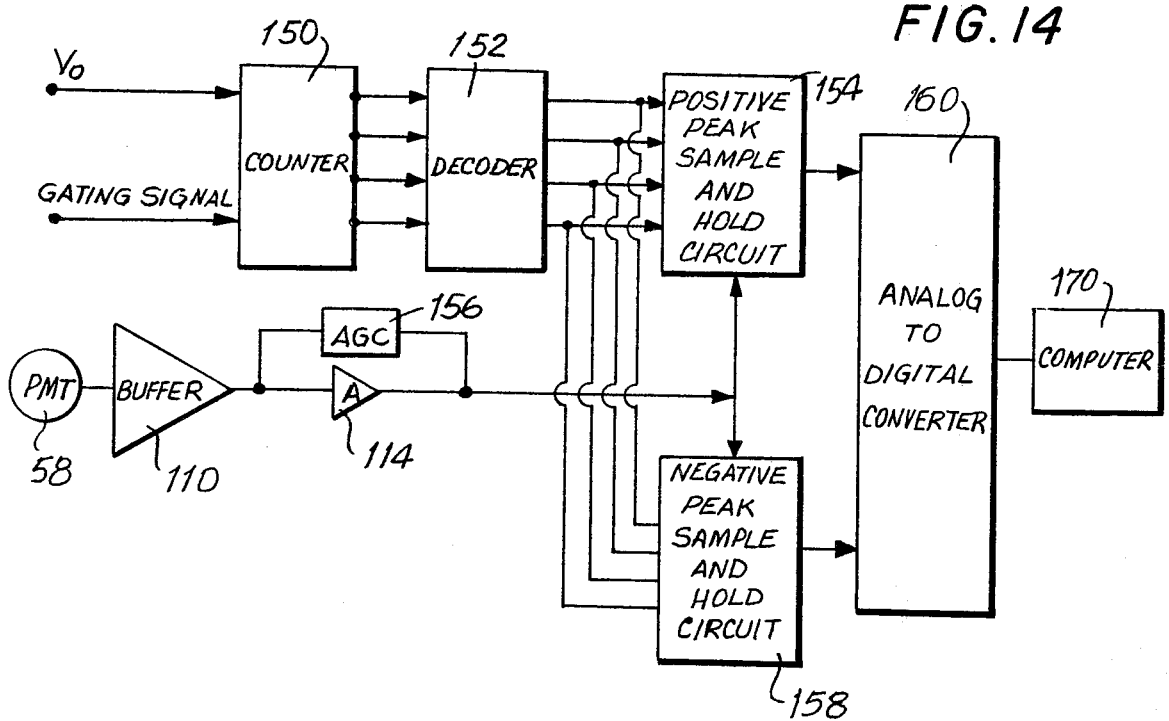
FIG. 14 is a schematic circuit diagram of a circuit for determining the dynamic print contrast signal function.

Turning now to FIG. 14, the illustrated circuit is operative to determine dynamic PCS. A counter 150 has one input adapted to receive the voltage $V_0$ from the AND-gate 126 of FIG. 13(a). The other input of counter 150 is adapted to receive the gating signal, that is the output voltage from the resettable timer 124 of FIG. 13(a). The gating signal maintains the counter operative for as long as it takes for the input pulse train to be completely fed into the counter.

The decoder 152 selects a predetermined number (e.g. four) different "lines" along the scan. These "lines" will be used as representative lines for which the color contrast will be measured.

The PMT analog signal, as noted before, is fed to a buffer amplifier 110 and thereupon to amplifier 114 which has an automatic gain control section 156. For the dynamic PCS measurement, it is important to keep the analog signal relatively clean from variations caused by laser breathing, or by changes in ambient temperature, or by drift or aging in the laser and/or the PMT itself, or by supply voltage variations, and AGC means are therefore used to control an amplifier.

The gain-corrected analog signal is fed to a positive peak sample and hold circuit 154 which is operative to sample the four positive peak voltages which correspond to the light intensity of the four representative spaces, and thereupon to hold these four positive peak voltages.

The gain-corrected analog signal is also fed to a negative peak sample and hold circuit 158 which is operative to sample the four negative peak voltages which correspond to the light intensity of the four associated representative lines, and thereupon to hold these four negative peak voltages.

The positive and negative peak voltages are preferably separately added together by respective adders prior to being fed to the inputs of the analog-to-digital converter 160. The computer 170 is programmed in conventional manner to calculate the PCS ratio defined above.

Another function which can be selected is static PCS. This function is virtually identical to the dynamic PCS measurement, except that no line scanning is performed. Rather, a fixed 8-mil laser spot is initially placed on any line selected by the user. Thereupon, the laser spot is moved to any space selected by the user. It will be appreciated that the above-described large viewport greatly facilitates the proper positioning of the fixed spot on the respective space or line.

The fixed laser spot is preferably chosen to be at the center of the scan, and the present invention provides for changing from a line scan to a fixed beam spot substantially instantaneously by employing a stepper motor or by applying an encoded nulling pulse to an AC motor.

The PCS measurements described above require system calibration with "BLACK" and "WHITE" standards. One of the features of the present invention is that once the system is calibrated, the calibration remains permanently stored in the system no matter what measurement mode is selected.

Another function which can be selected from the keyboard is "MARGIN CHECK." The aforementioned gating signal will allow false graphic pulses into the computer which will be rejected in decoding if the associated printed graphics is too close to the UPC bar code symbol. If the printed graphics are far away from the symbol, then the gating signal will break up due to the response of the resettable timer 124 which is operative to generate a spurious signal which will not be decoded and a proper signal which can be properly decoded assuming, of course, that the symbol to be decoded is otherwise proper.

Still another use for the gating signal is to determine the so-called magnification factor which is defined as the normalized length of the bar pattern relative to a so-called nominal or 100%-sized symbol. The magnification factor sets the tolerance limits on the widths of the guard bars via a look-up table in the computer, which values vary depending on the size of the symbol. Also, the magnification factor can be employed to choose between a high frequency and a low frequency clock which for small symbols allows adequate resolution of the high frequency clock, and for large symbols prevents overflow.

Another function which can be selected at the keyboard is "GUARD BAR MEASUREMENTS." The present invention calculates the average of the widths of the line-space-line-space left guard bar combination, the average of the widths of the line-space-line-space center guard bar combination, and the average of the widths of the line-space-line-space right guard bar combination. Each of these combinations is separately displayed at display element 28 at spaced-apart locations along the latter for easy recognition of the variation of the widths of the left, center and right guard bar patterns across the symbol.

Furthermore, the tolerance limits for the guard bars as determined from the aforementioned look-up table and magnification factor are displayed at opposite end regions of display element 26 simultaneously with the guard bar display on display element 28.

Still another function which can be selected is "NEGATIVE FILM MASTERS." The photographer-engraver uses a negative film representation of the bar code symbol to burn-in the printing plate. This negative film has black areas where the white areas of the symbol will be, and vice versa. In order to provide this particular user with means to check the negative, depression of the "NEGATIVE FILM MASTERS" key permits decoding in an inverted manner to that described above.

Yet another function which can be selected is "SINGLE SCAN" or "MULTIPLE LINE SCAN," both of these functions being described above in detail.

Another function unique to the present invention is the "PRINT" key which cooperates with a mechanical printer 175 which is built-into the console housing 172. Any one or all of the aforementioned functions can be independently printed and recorded on paper.

Furthermore, the present invention provides the capability to print out the delta ratios and delta distances as computed by the well-known delta ratio algorithm. This feature is heretofore unknown in the prior art.

Finally, the console 14 has a function-indicator board 180 which is subdivided into areas which essentially correspond to the keyboard 24. Each area is provided with an indicator light to indicate which of the functions has been selected.

It will be understood that each of the elements described above, or two or more together, may also find a useful application in other types of constructions differing from the types described above.

While the invention has been illustrated and described as embodied in a PORTABLE LASER SCANNING ARRANGEMENT FOR AND METHOD OF EVALUATING AND VALIDATING BAR CODE SYMBOLS, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a laser scanning system for evaluating and validating bar code symbols, a portable laser scanning head comprising:
    (a) means on said head for directing a laser light beam towards a bar code symbol for reflection therefrom;
    (b) means on said head for detecting the intensity of the light reflected from the symbol, and for generating an electrical signal indicative of the detected intensity of the reflected light;
    (c) means on said head for selecting a characteristic of the symbol;
    (d) means responsive to selection of the characteristic for decoding the electrical signal, and for generating data descriptive of the decoded signal; and
    (e) means on said head for displaying the generated data, whereby the mounting of the displaying means and the selecting means on the head facilitates data reading and characteristic selection at the site of the symbol to be analyzed.

2. The portable laser scanning head of claim 1, wherein said directing means includes a laser; and further comprising a portable housing in which said laser is mounted; and also comprising means for holding said housing for movement towards and away from the symbol to be analyzed, including a carrying handle remote from and out of thermal contact with said laser.

3. The portable laser scanning head of claim 2; and further comprising a shock mounting support plate which subdivides the interior of said portable housing, said laser being mounted on one side of said support plate.

4. The portable laser scanning head of claim 1; and further comprising resilient contact means on said head for conforming the latter to the surface on which the symbol is imprinted.

5. The portable laser scanning head of claim 1; and further comprising a housing exit port for juxtaposition with the symbol to be analyzed, and a housing viewport through which the juxtaposed symbol can be observed; and also comprising means for illuminating the viewport, and means for disabling said displaying means upon illumination of the viewport.

6. The portable laser scanning head of claim 5; and further comprising a carrying handle on said head, and wherein said disabling means includes a switch proximally located adjacent said handle.

7. The portable laser scanning head of claim 1, wherein said displaying means includes a pair of display elements; and further comprising means for formatting the generated data such that each display element has a different portion of the generated data.

8. In a laser scanning system for scanning bar code symbols, a portable laser scanning head comprising:
   (a) means in said portable head for directing a laser light beam towards a bar code symbol which has bars and spaces successively spaced apart of each other along a predetermined direction; and
   (b) multiple line scanning means for generating a raster-type scan pattern, including
      (i) first miniature scan means in said portable head for moving the laser light beam lengthwise of the symbol along said predetermined direction, and
      (ii) second miniature scan means in said portable head for moving the laser light beam in transverse direction substantially orthogonal to said predetermined direction for a stroke distance at least equal to one-half of the transverse height of the symbol along said orthogonal direction.

9. The portable laser scanning head of claim 8; and further comprising single line scanning means for generating a single scan line which extends lengthwise of the symbol along said predetermined direction; and also comprising means for alternately selecting between said single line scanning means and said multiple line scanning means.

10. The portable laser scannng head of claim 8; and further comprising means for synchronizing the movement of said laser light beam by said first scan means between a pair of end limiting positions, with the movement of said laser light beam by said second scan means, said synchronizing means including means at one of said end limiting positions for sensing the presence of said light beam at said one end limiting position, and for generating an electrical signal in response to such sensing.

11. The portable laser scanning head of claim 8, wherein one of said scan means is a ferro-electric-type bimorph mounted on said head for movement relative thereto; and further comprising drive means for moving said bimorph in a predetermined cyclic manner over a predetermined time period.

12. The portable laser scanning head of claim 11, wherein said drive means includes circuit means for generating a voltage having a triangular waveform, said circuit means including means for generating a substantially constant high voltage level for one-half said time period, and for generating a substantially constant low voltage level for the other half of said time period; and means for integrating said high and said low voltage levels to thereby generate said triangular waveform.

13. The portable laser scanning head of claim 11; and further comprising a support plate on which said bimorph is mounted, a leaf spring on which a reflecting mirror is mounted, and a flexible strip connected to said leaf spring and said support plate.

14. The portable laser scanning head of claim 8, wherein one of said scan means is a speaker-type element having a movable flexible diaphragm; and further comprising drive means for moving said flexible diaphragm in a predetermed cyclic manner.

15. The portable laser scanning head of claim 8, wherein said scan pattern is comprised of a plurality of generally parallel, equidistantly spaced-apart scan lines which are substantially linear and do not intersect each other over the entire field of said raster-type scan pattern as considered in both the predetermined and the orthogonal directions.

16. A laser scanning system for evaluating and validating bar code symbols, comprising:
   (a) a console;
   (b) a portable laser scanning head movable relative to and operatively connected with said console;
   (c) means on said head for directing a laser light beam towards a bar code symbol for reflection therefrom;
   (d) means on said head for detecting the intensity of the light reflected from the symbol, and for generating an electrical signal indicative of the detected intensity of the reflected light;
   (e) means on said head for selecting a characteristic of the symbol;
   (f) means responsive to selection of the characteristic for decoding the electrical signal, and for generating data descriptive of the decoded signal; and
   (g) means on said console for recording the generated data, said recording means including a printer operative for recording each and every of the generated data in response to operation of said selecting means.

17. In a laser scanning system for reading bar code symbols, a portable laser scanning head, comprising:
   (a) a portable hand-held housing;
   (b) means in the portable housing for directing a laser light beam along a light path towards a bar code symbol which is located in the vicinity of a reference plane that is located exteriorly of the portable housing, said directing means including
      (i) light source means for generating the laser light beam, said light source means being mounted within and enclosed on all sides by the housing; and
      (ii) optic means for optically modifying the laser light beam to produce a scanning beam spot, said optic means including an optical train in the light path and operative for producing the scanning beam spot with an axial cross-section whose size is generally maintained in the vicinity of the reference plane over a working distance which is at least one-half inch as measured with respect to the reference plane;
   (c) miniature multiple line scanning means in the portable housing for generating a raster-type scan pattern which has a height at least on the order of ⅜ inches and which is comprised of a plurality of generally parallel, equidistantly spaced-apart scan lines by sweeping the laser light beam across the bar code symbol for reflection therefrom over a field of view which has a linear dimension up to on the order of four inches, said miniature line scanning means including a miniature scanning element in the light path and operative for changing the sweep direction of the laser light beam in a predetermined cyclic manner;
   (d) means in the portable housing for detecting the intensity of light reflected from the bar code symbol, and for generating an electrical signal indicative of the detected intensity of the reflected light; and (e) means in the portable housing to process the electrical signal for generating therefrom data descriptive of the bar code symbol.

18. The portable laser scanning head of claim 17, wherein said light source means constitutes an unpackaged lightweight laser tube; and further comprising means for mounting the laser tube in shock-resistant relationship with the portable housing.

19. The portable laser scanning head of claim 18, wherein said laser tube mounting means includes a shock mounting support plate mounted within the interior of the portable housing, and a plurality of shock mounting springs mounted on the support plate and being located at opposite sides of the laser tube for supporting the same in shock-resistant relationship relative to the housing.

20. The portable laser scanning head of claim 17; and further comprising handle means mounted on the portable housing for permitting a user to transport the latter by hand towards and away from the symbol to be read.

21. The portable laser scanning head of claim 20, wherein said light source means constitutes a Helium-Neon laser tube, and wherein said handle means includes a carrying handle mounted remote from and out of thermal contact with the laser tube.

22. The portable laser scanning head of claim 17; and furthr comprising a housing exit port for juxtaposition with the symbol to be read, and a housing viewport through which the juxtaposed symbol can be observed; and also comprising means for illuminating the viewport, and means for disabling said displaying means upon illumination of the viewport.

23. The portable laser scanning head of claim 22; and further comprising a carrying handle on said housing, and wherein said disabling means includes a switch proximally located adjacent said handle.

24. The protable laser scanning head of claim 17; and further comprising means for selecting a characteristic of the symbol; and wherein said processing means is operative for generating data descriptive of the selected characteristic so as to operate the laser scanning system as a reading, evaluating and analyzing system.

25. The portable laser scanning head of claim 17; and further comprising keyboard means for selecting a characteristic of the symbol, said keyboard means being mounted on the portable housing for facilitating characteristic selection at the site of the symbol to be read.

26. The portable laser scanning head of claim 17; and further comprising display means for displaying the generated data, said display means being mounted on the portable housing for facilitating data reading at the site of the symbol to be read.

27. The portable laser scanning head of claim 26, wherein said displaying means includes a pair of display elements; and further comprising means for formatting the generated data such that each display element has a different portion of the generated data.

28. The portable laser scanning head of claim 17; and further comprising means on said housing for selecting a characteristic of the symbol; wherein said data generating means includes means responsive to selection of the characteristic for decoding the electrical signal, and for generating data descriptive of the decoded signal; and further comprising means on said housing for displaying the generated data, whereby the mounting of the displaying means and the selecting means on the housing facilitates data reading and characteristic selection at the site of the symbol to be read.

29. The portable laser scanning head of claim 17, wherein said miniature multiple line means includes first miniature scan means in said portable housing for moving the laser light beam lengthwise of the symbol in a predetermined direction along which the symbol is elongated, and second miniature scan means in said portable housing for moving the laser light beam in transverse direction substantially orthogonal to said predetermined direction for a stroke distance at least equal to one-half of the transverse height of the symbol along said orthogonal direction.

30. The portable laser scanning head of claim 29; and further comprising means for selecting a characteristic of the symbol; and wherein said processing means is operative for generating data descriptive of the selected characteristic so as to operate the laser scanning system as a reading, evaluating and analyzing system; and wherein said scan pattern is comprised of a plurality of generally parallel, equidistantly spaced-apart scan lines which are substantially linear and do not intersect each other over the entire field of said raster-type scan pattern as considered in both the predetermined and the orthogonal directions.

31. The portable laser scanning head of claim 30; and further comprising means for disabling the second miniature scan means to thereby convert the multiple line scanning means to single line scanning means for generating a single scan line which extends lengthwise of the symbol along said predetermined direction; and also comprising means for alternately actuating and deactuating and disabling means so as to select between the single scan line and the plurality of scan lines.

32. A miniature light beam scanning device, comprising:
(a) a stationary support plate having a pair of spaced-apart support regions;
(b) a displaceable component having a cantilevered end region mounted at one of the support regions of the support plate, and a free end region movable relative to the cantilevered end region;
(c) a mirror component having a reflective surface positioned in the path of a light beam to be scanned; and
(d) means for mounting the mirror component for amplified angular movement relative to the support plate, said mounting means including
(i) elongated resilient support means having a first end region operatively connected to the free end region of the displaceable component, a second end region operatively connected to the other support region of the support plate, and an intermediate flexible region on which the mirror component is mounted for amplified movement as compared to the movement of the free end region of the displaceable component.

33. The scanning device of claim 32, wherein said resilient support means includes a resilient leaf spring and a flexible tape.

34. The scanning device of claim 32, wherein said displaceable component is a ferro-electric-type oscillatory bimorph; and further comprising means for driving the bimorph in a predetermined cyclic manner, said amplified movement constituting a scanning distance on the order of at least one-half inch.

35. The scanning device of claim 32, wherein said displaceable component includes a ferro-electric-type oscillatory bimorph; and further comprising means for operating the bimorph in a resonant, closed loop, electro-mechanical configuration, said amplified movement constituting a scanning distance on the order of at least one inch.

36. The scanning device of claim 32, wherein said displaceable component includes a resilient element and a speaker-type oscillator having a movable flexible disphragm operatively interconnecting the latter with the free end region of the resilient element; and further comprising means for moving the diaphragm together with the resilient element in a predetermined cyclic manner, said amplified movement constituting a scanning distance on the order of at least one-half inch.

37. A miniature light beam scanning device comprising:
 (a) a ferro-electric-type oscillatory bimorph;
 (b) means for operative the bimorph for movement in a resonant, closed loop electro-mechanical configuration;
 (c) a mirror component having a reflective surface positioned in the path of a light beam to be scanned; and
 (d) means operatively connected between the mirror component and the bimorph for moving the mirror over a scanning distance on the order of at least one inch.

* * * * *